US005548900A

United States Patent [19]

Hunt-Grubbe

[11] Patent Number: 5,548,900

[45] Date of Patent: Aug. 27, 1996

[54] MEASURING INSTRUMENTS

[76] Inventor: Robert H. Hunt-Grubbe, Glencote, Lower Common, Eversely Hampshire, RG27 OQU, England

[21] Appl. No.: 308,799

[22] Filed: Sep. 16, 1994

[30] Foreign Application Priority Data

Sep. 20, 1993 [GB] United Kingdom ................... 9319402

[51] Int. Cl.$^6$ .............................. G01B 5/12; E21B 47/08

[52] U.S. Cl. ................................................ 33/302; 33/544

[58] Field of Search ........................ 33/1 H, 302, 501.14, 33/544, 552, 556, 557, 558.01, 558.04, 558.2, 558.3, 558.4

[56] References Cited

U.S. PATENT DOCUMENTS

| | | | |
|---|---|---|---|
| 713,784 | 11/1902 | Mellor | 33/302 |
| 3,685,158 | 8/1972 | Planche | 33/302 |
| 4,235,020 | 11/1980 | Davis et al. | 33/544 |
| 4,251,921 | 2/1981 | Fink | 33/302 |
| 4,302,881 | 12/1981 | Schwind et al. | 33/558.04 |
| 4,851,733 | 7/1989 | Rothstein | 33/302 |

FOREIGN PATENT DOCUMENTS

| | | | |
|---|---|---|---|
| 55-113902 | 9/1980 | Japan | 33/544 |
| 59-211804 | 11/1984 | Japan | 33/544 |
| 1171016 | 11/1969 | United Kingdom . | |
| 2066470 | 7/1981 | United Kingdom | 33/544 |
| 2121966 | 6/1982 | United Kingdom . | |

*Primary Examiner*—William A. Cuchlinski, Jr.
*Assistant Examiner*—G. Bradley Bennett
*Attorney, Agent, or Firm*—Robert W. J. Usher

[57] ABSTRACT

In a downhole measuring caliper for oil well casings, comprising a circumferential array of radially extensible sensing fingers (30) between upper and lower sets of centralizing arms, the fingers are actuated through integral pre-stressed spring arms (34) engaged with an actuating member on the axis of the instrument; relative axial movement between the array of fingers and the actuating member causes the fingers to pivot into measuring contact with the tube wall. The number of sensing fingers is maximized and maintenance is simplified.

21 Claims, 2 Drawing Sheets

30
32
38
40
42
46
50
36
34
48
44
52

MEASURING INSTRUMENTS

This invention relates to measuring instruments, and in particular to instruments for measuring the inside of a tube.

Instruments exist to inspect the internal surfaces of pipes and tubes by extending a plurality of fingers against the surfaces, and measuring the extension of each finger. The acquired data may be recorded in the instrument for later retrieval or transmitted to a remote viewing or recording device. These instruments may be used to inspect geophysical bore hole casings, boiler tubes and pipelines of all sorts.

The purpose of inspection is typically to evaluate wear, corrosion, deposition, distortion and other kinds of damage expressed as dimensional change, or to locate known physical features within the pipe or tube.

A typical instrument for monitoring radius variations in petroleum well casings includes a circumferential array of radially extending fingers arranged around a cylindrical instrument body which is centered in the tube by auxiliary means above and below the fingers. When a set of readings is to be taken, the fingers are extended until each one abuts the inner surface of the casing at the given location, and suitable sensors associated with each finger determine how far it has extended. The resulting data represents the cross-section of the casing at that position, with an accuracy depending on the sensitivity of the measuring sensors and the number of points around the circumference at which readings were taken, which corresponds to the number of fingers.

This invention is concerned principally with improvements in the fingers and in the means by which they are extended and retracted from the inner surface of the tube.

The present invention concerns aspects of a sensing finger for a measuring instrument, and of a measuring instrument including one or more sensing fingers. The scope of the invention extends to all novel aspects of the measuring instrument described herein, including the sensing fingers, whether individually or in combination with other features, and whether such combinations are explicitly recited or not.

More specifically, in one aspect of the invention a sensing finger for a measuring instrument, having a tip whose position is to be measured when it abuts an object, which finger is provided with a locating portion adapted to cooperate with amount for the finger so that the finger can move along one path with respect to the mount, and a reference point which moves according to movement of the tip, comprises resilient means integral with the finger for moving the finger.

In another aspect of the invention, a measuring instrument comprising at least one such sensing finger further comprises means for detecting and measuring movement of the reference point. Such means can be of any convenient kind, and may be electrical, magnetic, electromagnetic, piezoelectric, optical, optoelectrical and so on. In principle, any means whereby the movement of the reference point can be transformed into data referencing the tip of the finger may be used. Preferably, the output of the means is an electrical signal which can be transmitted to a remote monitoring or control station, or recorded for later recovery and inspection.

The locating portion provided on the finger and the cooperating mount may together form a pivot bearing, being for example a portion of a disc received in a socket; this may permit a lever action for amplifying the motion of the finger. On the other hand, alternatives such as slide bearings are possible.

The finger preferably moves along one unique path with respect to the mount, so that the position of the reference point unambiguously defines the position of the tip of the finger. This position may be defined relative to its previous position, or relative either to the mount for the finger or to the body on which it is situated.

The finger need not be perfectly rigid between the tip and the reference point in the plane (or planes) of motion of the finger, provided that the one always has a uniquely defined position relative to the other. It is to be understood that in this context a uniquely defined position includes one in which random variations in this relationship are insignificant compared to the sensitivity and range of the means for detecting and measuring movement.

The resilient means preferably comprises a spring arm on the sensing finger. If one end of the spring arm is integral with the finger, the other end of the spring arm may be slideably engaged with guide means on the sensing finger. The resilient means may be pre-stressed, to provide the desired spring characteristics.

The sensing finger my be substantially planar, and move in that plane.

The resilient means may include means for engaging an actuating member, and such means may comprise a cam surface on one of the resilient means and the actuating member, and a cam follower on the other.

The sensing finger and its integral resilient means may be machined from a single piece of steel, other alloy or engineering plastics material. Alternatively, the parts can be formed separately and subsequently united by welding, brazing, or other like technique suitable to the materials concerned.

The invention is illustrated by way of example in the accompanying drawings, in which.

Figure 1:
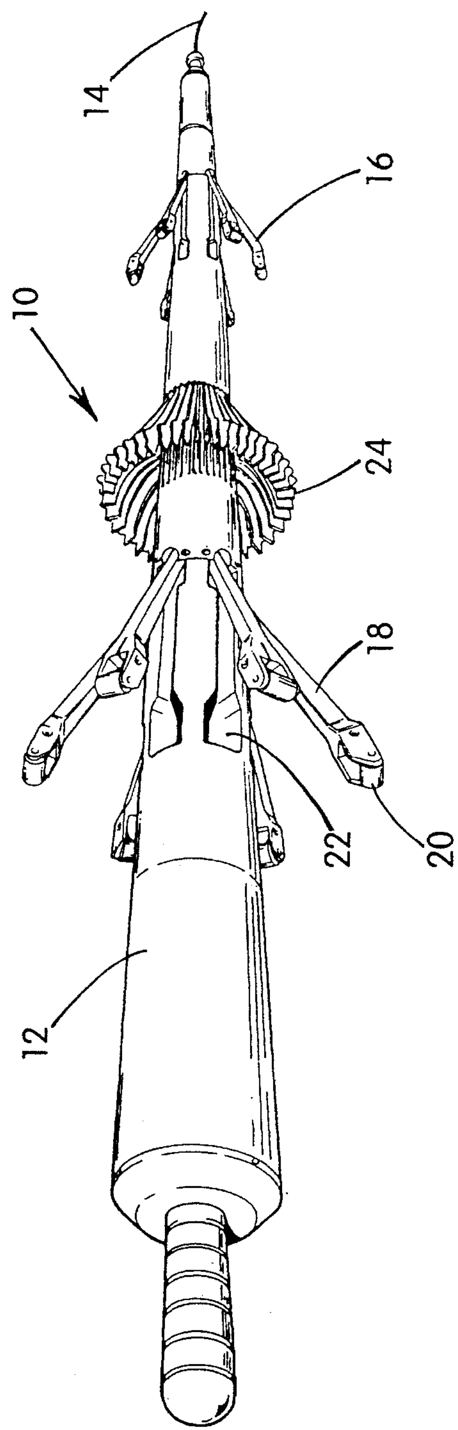
FIG. 1 is a perspective view, from below and one side, of a downhole measuring caliper for oil well casings, illustrating the known features of such devices.

FIG. 1 shows a caliper 10 of a known kind having a long thin cylindrical body 12 which contains sensors, motors, telemetry devices and the like. The caliper is suspended from a combination support, power, command and data cable 14, by means of which it can be lowered some thousands of meters down a well casing.

The caliper is equipped with an upper set of centralizing arms 16 and a lower set of centralizing arms 18. Each centralizing arm is tipped with a roller 20, and is shown extended from a parking recess 22 in the caliper body 12.

Between the upper and lower sets of centralizing arms is an evenly spaced circumferential array of forty sensing fingers 24, which can be opened and closed radially of the caliper.

In use, the centralizing arms and sensing fingers are retracted prior to lowering the caliper into the tube to be measured. When measurements are to be made, an electric motor causes the centralizing arms and measuring fingers to open until the centralizing arm rollers 20 reach the tube wall. At this moment the tool is centralized by means of the spring forces acting on the centralizing arms. In this condition the caliper can be drawn along the tube by the cable making measurements as it moves. If the tool meets a restriction, the spring forces acting on the centralizing arms and measuring fingers permit the arms and fingers to close towards the body of the tool, thus allowing it to pass freely. In the event of power loss, the tool can be retrieved from the tube by pulling on the cable.

During opening of the tool, each measuring finger 24 is extended from the tool body by means of a spring linkage, until the finger comes to rest with a certain force against the tube wall. Sensors generate data representative of the position of each finger, which is transmitted to the surface through data channels in cable 14.

The mechanism associated with each sensing finger 24 in this and in other prior art designs tends to be complex, with concomitant disadvantages in terms of assembly, disassembly, maintenance and replacement parts.

Figure 2:
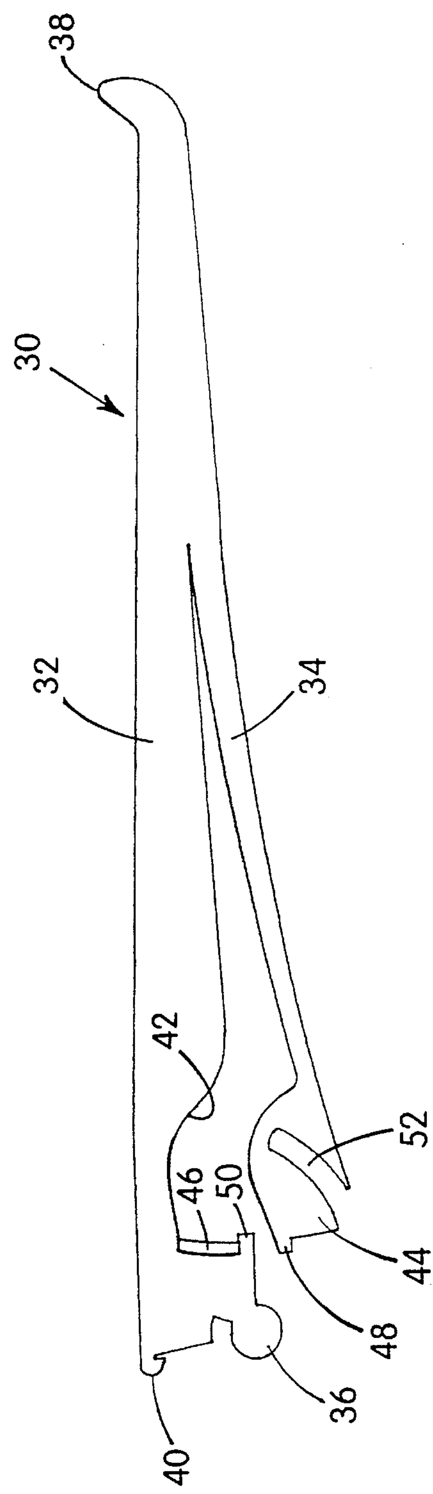
FIG. 2 is a side elevation of a modified sensing finger in accordance with the invention.

FIG. 2 shows an alternative sensor finger 30 for a caliper in accordance with the present invention.

Caliper finger 30 is formed from a single flat metal sheet, of a uniform thickness, typically between 1 mm and 2 mm. Although it is formed in one piece, it can be considered as consisting of two distinct portions: a caliper arm 32, which is essentially rigid in the plane of the drawing, and a spring arm 34, which at one end is integral with the rigid caliper arm and at the other end terminates in slide head 44 which is resiliently movable towards and away from the rigid arm.

The rigid caliper arm 32 extends from a pivot disc portion 36 to a rounded tip 38 which is intended, in use, to make measuring contact with the tube wall when the finger 30 pivots on disc 36. The caliper arm 32 additionally includes a nose portion 40, which serves as a reference point to which can be affixed any conventional means for activating a sensor to detect the angular position of the caliper arm as it pivots, a profiled portions 42 to accommodate the head 44 of spring arm 34, a slide 46 for guiding tongue 48 on the head of the spring arm when the head is, in use, accommodated in profiled portion 42 of the rigid arm, and a stop 50 to retain tongue 48 on slide 46.

As shown in FIG. 2, spring arm 34 is in its natural unstressed position. Prior to use, as alluded to above, and as illustrated in FIGS. 3 and 4, spring arm 34 is pre-stressed by pressing its head 44 towards the profiled portion 42 and latching tongue 48 over stop 50 and against slide 46.

The head 44 of the spring arm 34 is provided with an arcuate guide slot 52 which will receive an actuating member in the assembled caliper.

Figure 3:
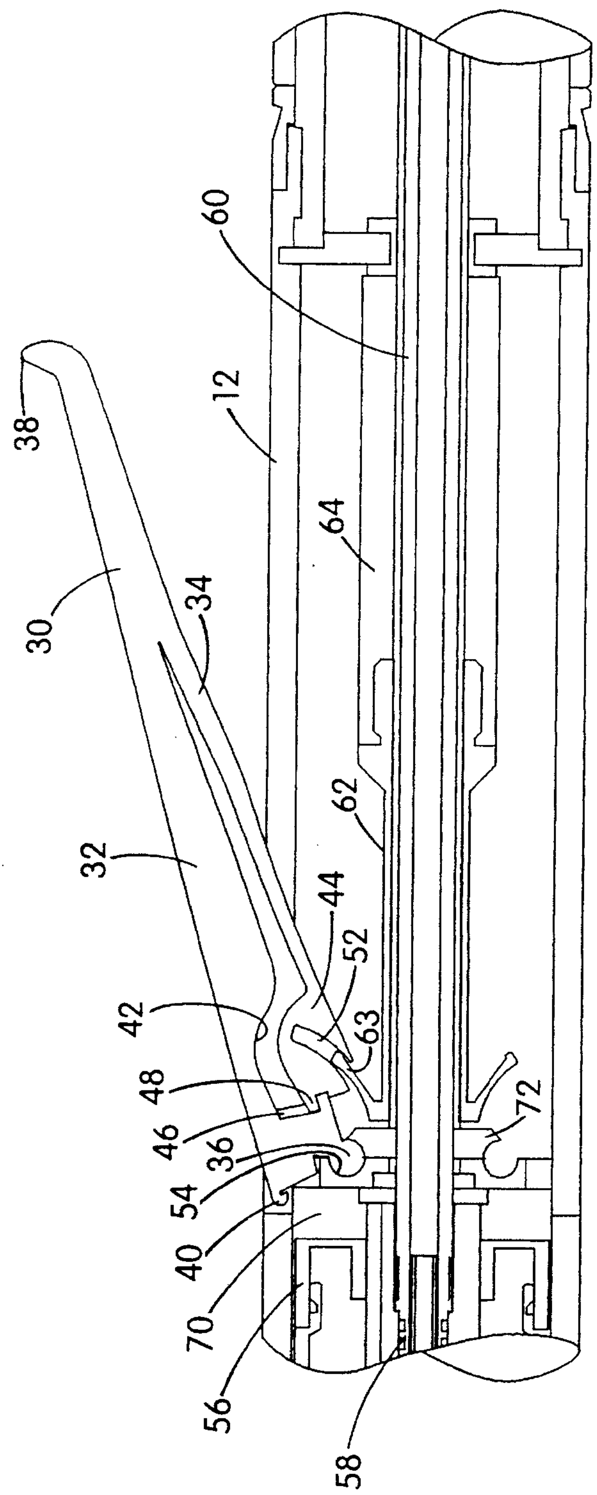
FIG. 3 is a partial sectional view showing the sensing finger of FIG. 2 mounted on a measuring instrument, in the extended position.
Figure 4:
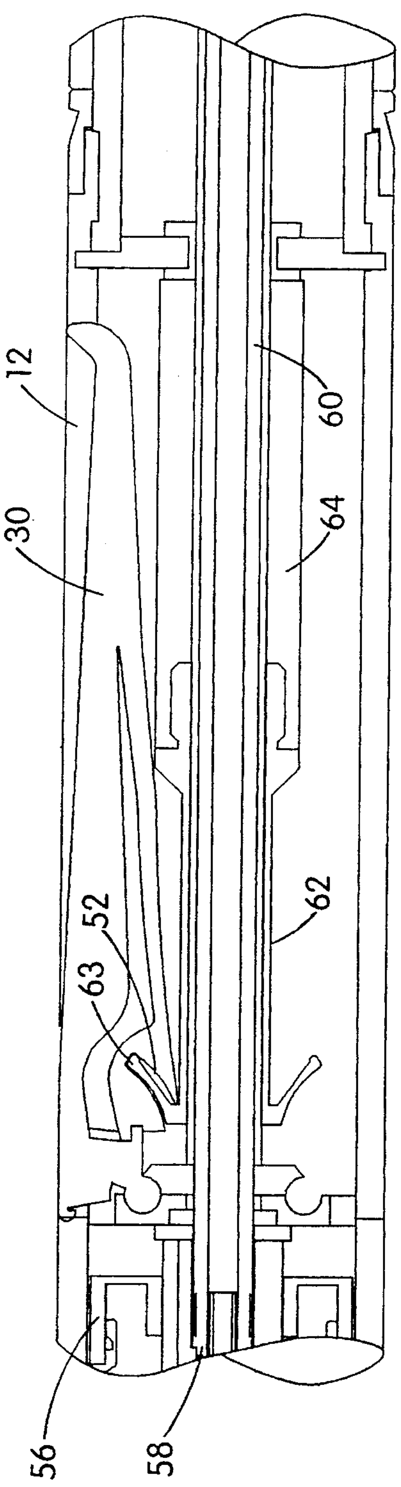
FIG. 4 is a similar view to FIG. 3, but showing the finger in the retracted position.

This is shown in FIGS. 3 and 4. Each of a plurality of fingers 30, all identical, is mounted by its pivot disc portion 36 in a receiving socket 54 provided on a carriage 56 within the body 12 of the caliper. Carriage 56 can be driven axially by means of lead screw 58 on motor spindle 60, which can be turned in either direction, to drive carriage 56 up or down the caliper, by an electric motor (not shown) located further down the caliper. The guide slot 52 in each finger 30 is engaged by an actuating member 62 which is carried coaxially about motor spindle 60 on a tubular mounting 64 which is solid with the caliper body 12.

The functional portion of actuating member 62 is a generally frusto-conical skirt 63 which has a gently concave outer surface to accommodate the curvature of the corresponding face of guide slot 52 in the head of the caliper spring arm 34.

When lead screw 58 is turned, carriage 56, on which fingers 30 are mounted, is driven either towards or away from the fixed actuating member 62. The skirt 63 acts in the fashion of a cam follower on the cam surfaces within guide slot 52 to extend or retract the fingers 30. During extension of each finger (FIG. 3) its tip 38 will eventually contact the tube wall and stop moving. Spring arm 34 accommodates further movement of the finger mounting point 54 towards the actuating member 62, by permitting tongue 48 to follow slide 46 as the head 44 of the spring arm moves into the profiled portion 42 on the rigid caliper arm 32.

Carriage 56 contains any convenient kind of proximity sensor 70 which detects the position of the reference point provided by nose 40, or a probe carried by nose 40, when each caliper finger 30 has come to rest.

Each finger follows one unique path relative to carriage 56 on which it is mounted, as it pivots outwardly towards the tube wall. The position of the nose 40 determined by proximity sensor 70 unambiguously defines the position of the finger tip 38 relative to the carriage. Since the carriage moves only axially along the instrument, the radial extension of the tip can readily be determined relative to the axis of the instrument.

The pivot disc portions 36 of all the caliper fingers 30, which locate the fingers on the instrument, are held in the respective mounting sockets 54 by means of removable socket closure ring 72. A maximum number of fingers can be mounted on the caliper, the limit being set by the thickness of the fingers. No independent springs or spring fasteners are required, and the whole sensing finger assembly can easily be dismantled for maintenance and repair, and replaced.

I claim:

1. A sensing finger for a measuring instrument, said finger comprising:

a tip whose position is to be measured when it abuts an object;

a locating portion for cooperating with a mount for the finger so that the finger can move along a path with respect to the mount;

a reference point which moves according to movement of the tip; and resilient means integral with the finger for moving the finger.

2. A sensing finger according to claim 1 wherein the resilient means is pre-stressed.

3. A sensing finger according to claim 1 wherein the resilient means comprises a spring arm on the sensing finger.

4. A sensing finger according to claim 3 wherein the spring arm has two ends, one end of the spring arm is integral with the finger, and the sensing finger is provided with guide means for the other end of the spring arm, which is slideably engaged with the guide means.

5. A sensing finger according to claim 4 wherein the guide means comprise a slide and a stop, said other end of the spring arm is adapted to cooperate with the slide, and the stop is adapted to retain the said other end of the spring arm in cooperation with the slide.

6. A sensing finger according to claim 5 wherein the arrangement is such that the spring arm is pre-stressed while the said other end of the spring arm is retained in cooperation with the slide.

7. A sensing finger according to claim 5 which is substantially planar.

8. A measuring instrument comprising at least one sensing finger and cooperating mount therefor, wherein the finger comprises a tip whose position is to be measured when it abuts an object, a locating portion cooperating with the mount so that the finger can move along a path with respect to the mount, a reference point which moves according to movement of the tip, and resilient means integral with the finger for moving the finger; and further comprising means for detecting and measuring movement of the reference point.

9. A measuring instrument according to claim 8 wherein the resilient means comprises a spring arm on the sensing finger.

10. A measuring instrument according to claim 9 wherein the spring arm has two ends, one end of the spring arm is integral with the finger, and the sensing finger is provided with guide means for the other end of the spring arm, which is slideably engaged with the guide means.

11. A measuring instrument according to claim 10 wherein the guide means comprise a slide and a stop, said other end of the spring arm is adapted to cooperate with the slide, and the stop is adapted to retain the said other end of the spring arm in cooperation with the slide.

12. A measuring instrument according to claim 11 wherein the arrangement is such that the spring arm is pre-stressed while the said end of the spring arm is retained in cooperation with the slide.

13. A measuring instrument according to claim 12 wherein the sensing finger is substantially planar, and is adapted to move in that plane.

14. A measuring instrument according to claim 8 wherein the locating portion on the finger and the cooperating mount together form a pivot bearing.

15. A measuring instrument according to claim 14 wherein the sensing finger is adapted to move along one unique path with respect to the mount, whereby the position of the reference point unambiguously defines the relative position of the tip of the finger.

16. A measuring instrument according to claim 8 wherein the resilient means is pre-stressed.

17. A measuring instrument according to claim 16 further comprising an actuating member for the sensing finger, wherein one of the resilient means and the actuating member comprises a cam surface, and the other of the resilient means and the actuating member comprises a cam follower, whereby the cam surface and the cam follower engage the resilient means with the actuating member.

18. A measuring instrument according to claim 17 comprising a series of sensing fingers located at a close pitch in a circumferential array so that adjacent fingers are at a small angular separation, each finger being movable in a radial path with respect to the instrument, and the actuating member being located within the circumferential array of sensing fingers and engaged with the resilient means of the fingers.

19. A measuring instrument according to claim 18 wherein the actuating member comprises a generally frusto-conical skirt accommodated in a guide slot in the resilient means of each sensing finger.

20. A measuring instrument according to claim 18 wherein the sensing fingers are movable in response to relative axial movement between the array of fingers and the actuating member.

21. A measuring caliper for tubes, comprising an instrument according to claim 8 mounted in a cylindrical body between upper and lower sets of centralizing arms.

* * * * *